United States Patent [19]

Takahashi et al.

[11] 4,008,381
[45] Feb. 15, 1977

[54] MULTICHANNEL RECORD DISC RECORDING SYSTEM

[75] Inventors: Nobuaki Takahashi, Yamato; Takaro Mori; Yoshiki Iwasaki, both of Yokohama, all of Japan

[73] Assignee: Victor Company of Japan, Limited, Yokohama, Japan

[22] Filed: Sept. 4, 1975

[21] Appl. No.: 610,463

[30] Foreign Application Priority Data

Sept. 12, 1974 Japan .......................... 49-104387
Sept. 12, 1974 Japan .......................... 49-104386
Sept. 6, 1974 Japan .......................... 49-101953

[52] U.S. Cl. .............. 179/100.4 ST; 179/100.4 C; 179/1 G Q
[51] Int. Cl.² ......................................... G11B 3/00
[58] Field of Search ........... 179/100.4 ST, 100.4 C, 179/1 GQ

[56] References Cited

UNITED STATES PATENTS

3,772,467  11/1973  Ohwaki .................... 179/100.4 ST

*Primary Examiner*—Harold I. Pitts

[57] ABSTRACT

A multichannel record disc recording system comprises: a circuit for shaping sum and difference signals from multichannel signals, angle modulating the difference signal, multiplexing the sum signal and the angle-modulated difference signal, and recording the resulting signal on a record disc. A first level control circuit, in the transmission system for the sum signal, operates to attenuate the high-frequency band of components of the sum signal when its level is at a high level. A second level control circuit, in the transmission system of the difference signal, operates to attenuate the middle-high frequency band of components of the difference signal when its level is at a high level. The first level control circuit attenuates the level of the sum signal to prevent an admixing of the higher harmonics of the high frequency component of the sum signal into the band of the angle-modulated difference signal. The second level control circuit attenuates the level of the difference signal to prevent an overdeviation due to overmodulation of the angle-modulated difference signal.

7 Claims, 10 Drawing Figures

MULTICHANNEL RECORD DISC RECORDING SYSTEM

BACKGROUND OF THE INVENTION

The present invention relates generally to multichannel record disc recording systems, and more particularly to a system for multiplexing a direct wave signal and an angle-modulated wave signal and recording the same thus multiplexed on a record disc. The invention controls separately the levels of the angle-modulated wave signal and of the direct wave signal, in a manner which is optimum for each signal, and thereby records the resulting multichannel signals on the record disc.

In the 4-channel record disc recording system disclosed om U.S. Pat. Nos. 3,686,471 and 3,883,699, and already reduced to practice, signals from two channels are matrixed, to obtain sum and difference signals. Then, a carrier wave is angle modulated responsive to the difference signal. The resulting angle-modulated difference signal is multiplexed with a direct wave sum signal, and the signal thus multiplexed is recorded on the record disc.

If the levels of the respective channel signals are high, interference will readily occur between the high-frequency band of components and the angle-modulated wave difference signal of the direct wave sum signal. This interference occurs both at the time of the recording of the 4-channel record disc and at the time of the reproducing by means of a pickup cartridge. In such a case, the interference will give rise to various problems such as disturbance noise, impairment of the S/N ratio, and deterioration of the distortion factor.

Accordingly, in the prior art, a limiter is provided in each of the signal transmission systems of the four channel signals to limit the levels of all channel signals prior to the above mentioned matrixing. In carrying out this measure, it has been the practice, normally, to set the limiting level at a somewhat low value in order to prevent the generation of distortion at the time of reproducing over all signals recorded on the multichannel record disc.

By this known system, however, signals of a particular middle frequency band and a high frequency band become unnecessarily over-limited, and the dynamic range cannot be made wide.

On the other hand, in a multichannel record recording and reproducing system, the following kinds of noise are generated owing to the level of the recorded signal. One such noise occurs if there is a high level of the high frequency band of signal in the direct wave signal. An abnormal noise is then generated in the reproduced output as a result of mixing a higher harmonic component of the direct wave signal generated at the time of reproduction into the band of the angle-modulated wave signal. Another such abnormal noise is generated in the reproduced output when there is a high level of the middle-high frequency band of signal contained in the signal for angle-modulation. The frequency deviation of the angle-modulation wave becomes excessively large and, as a result, exceeds a specific frequency deviation range.

Thus range, in a multichannel record disc recording and reproducing system, there are differences in the modes of generation of distortion and noise in the reproduced signal owing to the level of the recorded signal. Furthermore, there are different relationships between the recorded signal frequency and the level required for suppressing, to a minimum, the generation of these abnormal noises. For this reason, it has been difficult to reduce the above described noises, in an optimum state, by the conventional practice of limiting the signals of all channels prior to matrixing.

SUMMARY OF THE INVENTION

Accordingly, it is a general object of the invention to provide a novel and useful multichannel record disc recording system in which the above described difficulties have been overcome.

Another and more specific object of the invention is to provide a system wherein level control means are respectively provided in a direct-wave signal transmission system and an angle-modulated wave signal transmission system. Multi-channel signals are recorded on a record disc by separately controlling the level of a direct-wave signal and an angle-modulated wave signal, and in an optimum manner for each signal.

Still another object of the invention is to provide a system of the above stated character in which the level controlling of the direct-wave signal and the angle-modulated signal is carried out with flat frequency and phase characteristics, and multichannel signals are thus recorded on a record disc.

A further object of the invention is to provide a system, of the above stated character, in which the level control of the direct-wave signal is further accomplished in accordance with the position of the cutting and recording on the record disc, and multichannel signals are thus recorded on the record disc.

Other objects and further features of the invention will be apparent from the following detailed description, with respect to preferred embodiments of the invention, when read in conjunction with the accompanying drawings.

DETAILED DESCRIPTION

Figure 1:
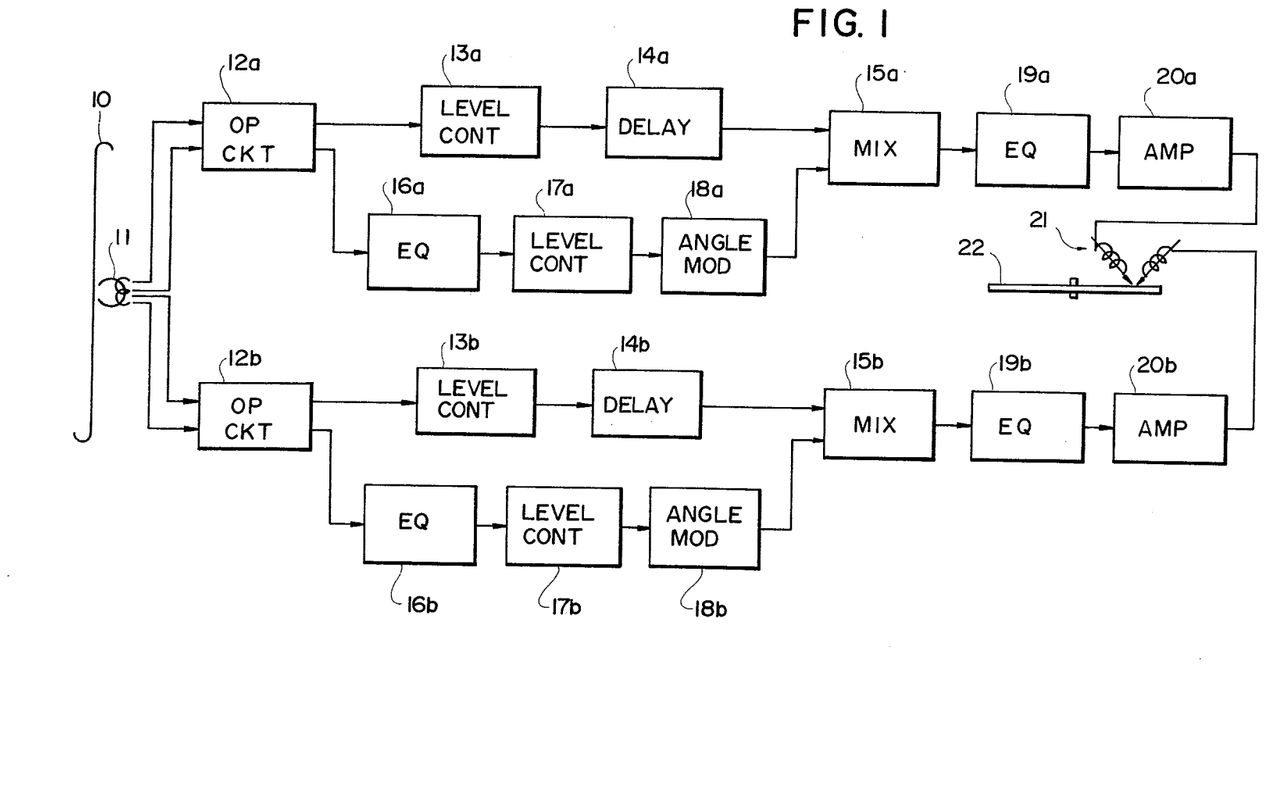
FIG. 1 is a block diagram showing a first embodiment of a multichannel record disc recording system, according to the invention.

One embodiment of the multichannel record disc recording system of the invention will be first described with reference to FIG. 1, which is a simplified block diagram thereof. On a magnetic tape 10, signals CH1 through CH4 of first through fourth channels are recorded on four separate tracks. Each channel signal is reproduced by a reproducing head 11. The reproduced first and second channel signals CH1 and CH2 are supplied to an operation circuit 12a, while the reproduced third and fourth channel signals CH3 and CH4 are supplied to an operation circuit 12b.

The resulting output sum signals Sa(CH1 + CH2) and Sb(CH3 + CH4) of the operation circuits 12a and 12b are respectively passed through level control circuits 13a and 13b and through delay circuits 14a and 14b, described hereinafter, and are supplied to mixers 14a and 15b.

On the other hand, the resulting output difference signals (Da(CH1 − CH2) and Db(CH3 − CH4) of the operation circuits 12a and 12b are respectively passed through FM/PM equalizers 16a and 16b. There a frequency response characteristic, indicated in FIG. 2 by the asymptote, is imparted to these signals. After being sent through level control circuits 17a and 17b, described hereinafter, the signals are supplied to angle-modulators 18a and 18b which angle-modulate carrier waves.

Figure 2:
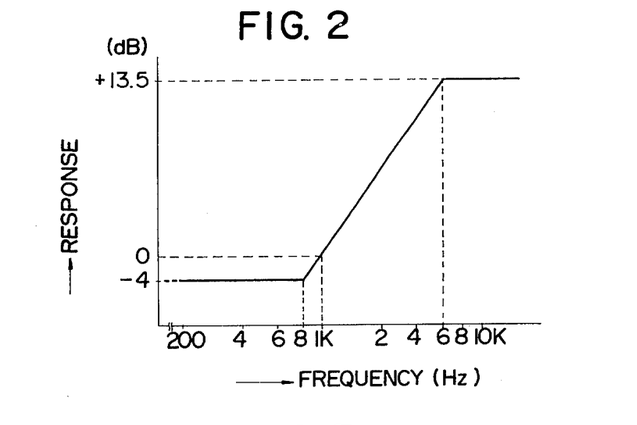
FIG. 2 is a graph indicating the equalizing characteristic of an FM/PM equalizer.

In this case, the equalizers 16a and 16b have given the modulation difference signals entering the angle-modulators 18a and 18b the characteristic indicated in FIG. 2. As a consequence, angle-modulated difference signals AMDa and AMDb are produced as outputs respectively from the angle-modulators 18a and 18b. These output signals are frequency modulator (FM) with respect to the frequency component of less than 800 Hz of the input modulation signals, phase modulator (PM) with respect to the frequency component of from 800 Hz to 6 KHz, and frequency modulator (FM) with respect to the frequency component above 6 KHz. These outputs are supplied to the mixers 15a and 15b.

The mixers 15a and 15b multiplex the above mentioned direct-wave sum signals Sa and Sb, having a frequency band of from 30 Jz to 15 KHz and the angle-modulated wave difference signals AMDa and AMDb having a frequency band of from 20 KHz to 45 KHz. The output multiplexed signals (Sa + AMDa) and (Sb + AMDb) of these mixers 15a and 15b are respectively sent to equalizers 19a and 19b, having a specific RIAA equilizing characteristic as indicated by the asymptote in FIG. 3. The RIAA characteristic is thus imparted to these signals. The resulting signals are amplified respectively by driving amplifiers 20a and 20b and thereafter supplied to the cutting stylus driving coils of a cutter head 21. The cutting stylus is thereby driven to record these signals respectively on the two walls of a signal sound groove of a record disc 22.

In the above described system shown as a block diagram, identical blocks are designated by the same difference numeral but respectively with different subscripts a and b. For this reason, the following description is set forth with respect to only the left channel system (first and second channel system) whose blocks have designations with the subscript a. The description of the right channel system (third and fourth channel system) whose blocks have designations with the subscript b will be omitted.

Figure 3:
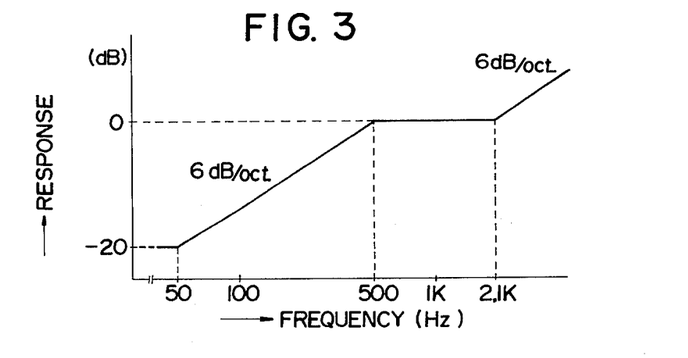
FIG. 3 is a graph indicating the equalizing characteristic of an equalizer having an RIAA characteristic.

The equalizer 19a intensifies the signal component above 2.1 KHz of the direct-wave sum signal Sa, with intensification by 6 dB/oct, in accordance with the equalizing characteristic indicated in FIG. 3. Consequently, in the direct-wave sum signal, the level of a signal component in the high-frequency band is intensified. The second and third harmonics readily become mixed into the band of the angle-modulated wave signal to give rise to interference with the angle-modulated wave signal. In this case, a distortion occurs in the demodulated output of the angle-modulated signal, in the reproducing system.

Accordingly, in the system of the present invention, the level control circuit 13a is provided in the sum signal transmission system extending from the operation circuit 12a through the mixer 15a. The level control is carried out in a manner which attenuates the level of the high-frequency band component of the input signal in accordance with the level of the input signal.

Figure 4:
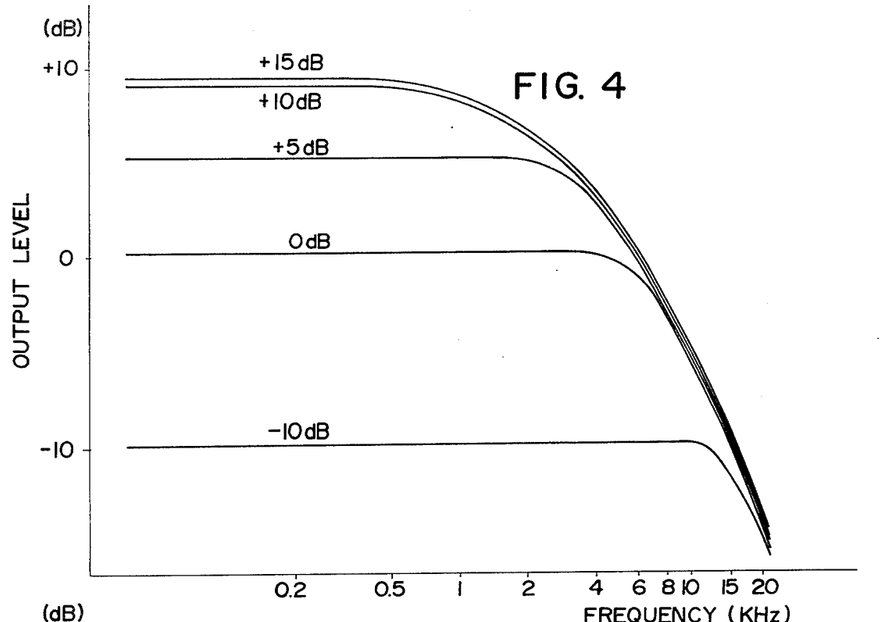
FIG. 4 is a graph indicating one example of the level control characteristic of a level control circuit, provided in a direct-wave sum signal transmission system.

More specifically, the level control circuit 13a the level of the high-frequency band of components (particularly from 10 KHz to 15 KHz) of the sum signal to a very low level. Furthermore, in accordance with the input level, its level control band is made different. For example, if the input level is of the order of −10 dB with respect to the standard level, the high frequency band of components (above approximately 12 KHz is attenuated. If the input level is in the order of +5 dB with respect to the standard level, the middle frequency band of components (over approximately 3 KHz) is attenuated. As a result, the frequency characteristic of the level of the output signal of the level control circuit 13a becomes as indicated in FIG. 4 (by values actually measured). In this FIG. 4, the numerals of the dB designations of the curves represent levels of input sum signals.

Thus, particularly when the level of the direct-wave signal is high, an admixing of the higher harmonics of the high frequency band of component into the angle-modulated wave band prevents interference distortion.

On the other hand, the equalizer 16a causes the difference signal Da to acquire a frequency response in conformance with the equalizer characteristic indicated in FIG. 2. Signal Da is thereafter angle-modulated (frequency-modulated and phase-modulated by the above mentioned frequency band) by the angle-modulator 18a. Here, if the level of the input difference signal is excessively high, it will give rise to over-modulation and cause a generation of distortion. The effect to this generation of distortion due to over-modulation differs between the high-frequency band of components and the middle frequency band of components. More specifically, in the high frequency band of components, the second and third harmonics, produced by the above mentioned distortion are outside of the audible frequency band. Therefore, they do not have a very great effect. With respect to the middle frequency band of components, however, the second and third harmonics produced by the above mentioned distortion are within the audible frequency band. Therefore, they are readily perceived by the ear, thereby giving rise to a substantially deleterious effect.

Accordingly, in the system of the present invention, the level control circuit 17a is provided in the difference signal transmission system extending from the operation circuit 12a to the mixer 15a, and more particularly in the transmission system extending from the operation circuit 12a to the angle modulator 18a. This level control circuit 17a attenuates the level of its middle frequency band of components in accordance with the level of the input signal.

Figure 5:
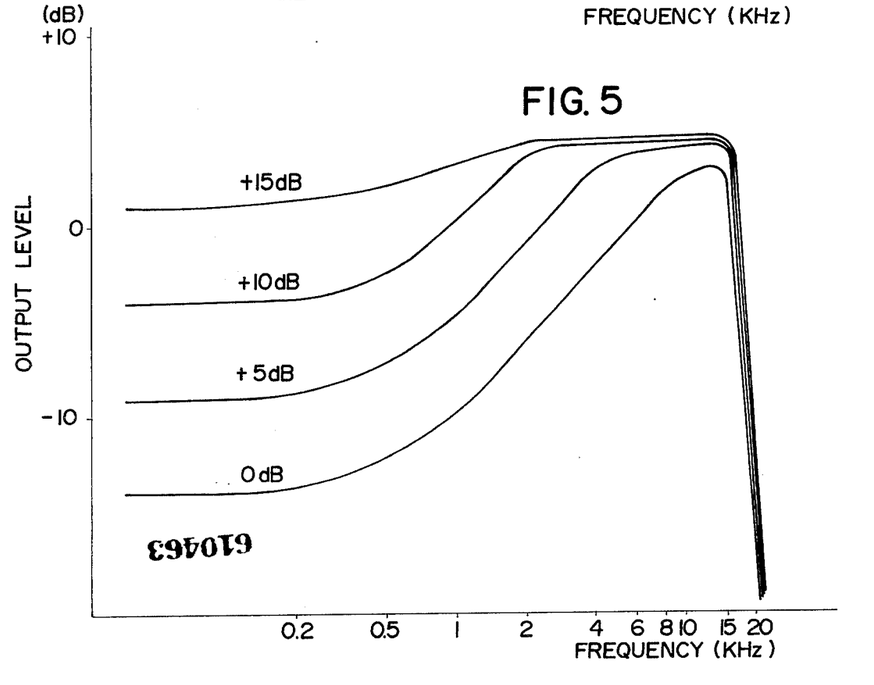
FIG. 5 is a graph indicating one example of the level control circuit, provided in a difference signal transmission system.

More specifically, the level control circuit 17a reduces to a low level the components of the middle frequency band to the middle-high frequency band, for example, of the difference signal. Moreover, in accordance with the input level, this level control circuit 17a changes the level control band. For example, if the input level is in the order of +5 dB relative to the standard level, level control circuit 17a attenuates the component of frequencies above 4 KHz. If the input level is in the order of +10 dB relative to the standard level, it attenuates the component of frequencies above 2 KHz. For this reason, the frequency characteristic of the level of the output signal of the level control circuit 17a becomes as indicated in FIG. 5 by actually measured values. In FIG. 5, the different dB numerals represent different levels of the input difference signals.

As an alternative arrangement, the level control circuit 17a may be provided between the operation circuit 12a and the equalizer 16a. This arrangement prevents overmodulation of the angle-modulated difference signal and generation of distortion due to an overdeviation thereof. Distortion arising from the high levels of the middle frequency band and high frequency band components of the difference signal are prevented.

Thus, in the present invention, level control circuits 13a (13b) and 17a (17b), respectively of different frequency-versus-level characteristic, are provided in the sum signal transmission system and the difference signal system, after the matrix operation circuit 12a (12b). This prevents generation of distortions respectively due to different causes with respect to the sum signal and the difference signal. Contrast this system with the prior art system in which level control circuits are provided in the transmission systems of the respectively separate channel signals CH1 and CH2 (CH3 and CH4), before the matrix operation circuit 12a (12b). Signals can be recorded at an overall higher level of approximately 6 dB. For example, this higher level occurs in the first and second (third and fourth) channel signals, if the level of the high frequency band of components of one of the channel signals is high, and the corresponding level of the other channel signal is low.

Next, a conventional level control circuit will be considered. In this circuit, the input signal is divided by high-pass, middle band-pass, and low-pass filters into signals of respective bands. These signals of respective bands are emitted in their respective amplitude, and are mixed to produce a level controlled signal as output. In this case, the phase characteristics and the frequency characteristics of the above mentioned filters must be selected to provide flat phase and frequency characteristics of the signal obtained by mixing. In the conventional circuit, however, it has been difficult to adapt the filters to produce the above mentioned flat phase and frequency characteristics.

If the phases of the sum signal and the difference signal become out of phase, the separation between the reproduced channel signals will be impaired. The acoustic normal of the sound image in the reproduced sound field will become unclear.

Accordingly, a novel level control circuit, is highly effective when applied to the level control circuit 13a (13b, 17a, 17b) of the system of the invention. This novel circuit prevents the above described problems from arising. It will now be described with respect to a specific embodiment of a circuit shown in FIG. 6.

Figure 6:
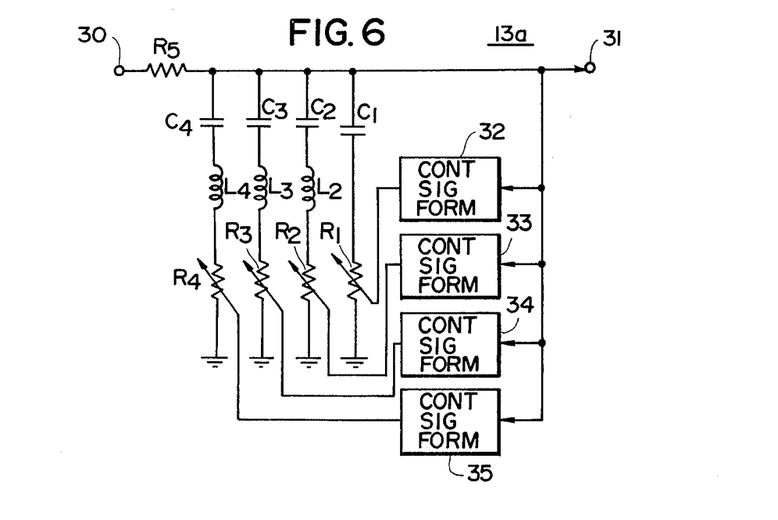
FIG. 6 is a circuit diagram showing one specific embodiment of a level control circuit for use in the system shown in block diagram form in FIG. 1.

The sum signal introduced from the operation circuit 12a into an input terminal 30 is passed through a resistor R5 and led out through an output terminal 31. At the same time, it is supplied respectively to control signal forming circuits 32, 33, 34, and 35. Each of these control signal forming circuits 32 through 35 comprises band-pass filters of mutually different filtering bands, a rectifying circuit, and a time constant circuit. These circuits 32 through 35 respectively generate DC control voltages in accordance with the levels of respectively different, specific frequency bands of the input signal from the input terminal 30.

Connected in parrallel between the junction of resistor R5 and the output terminal 31 and ground are a series circuit of a capacitor C1 and a variable resistor R1; a series circuit of a capacitor C1 and a variable resistor R1; a series circuit of a capacitor C2, a coil L2, and a variable resistor R2; a series circuit of a capacitor C3, a coil L3, and a variable resistor R3; and a series circuit of a capacitor C4, a coil L4, and a variable resistor R4. These series circuits respectively constitute resonant circuits. The resistance values of the variable resistors R1 through R4 are controllably varied responsive to DC control voltages respectively from the control signal forming circuits 32 through 35. By this arrangement, the series-connected resonant circuits attenuate the levels respectively of the components in the same bands as the passing frequency bands of the control signal forming circuits 32 through 35, with respect to the input signal from the input terminal 30.

For example, if an input signal having a high level frequency component, which is substantially the same as the resonant frequency of the capacitor C3 and the coil 13, enters the input termninal 30, the levels of the signal components passing through the band-pass filters within the control signal forming circuits 32, 33, and 35 are lower than a specific level. Control signals are not produced as outputs from the control signal forming circuits 32, 33, and 35, or, if they are produced as outputs, they are less than a specific voltage. On the one hand, the control signal forming circuit 34 produces a control signal of a voltage which is higher than the specific voltage. Therefore, the resistances of the variable resistors R1, R2, and R4 are not varied, but the resistance of the variable resistor R3 is lowered. The resonant circuit, including the capacitor C3 and the coil L3, attenuates the frequency component in the neighborhood of this resonant frequency.

On the other hand, when the level of the input signal entering through the input terminal 30 is very low over all frequency bands, control signals are not produced by the control signal forming circuits 32 through 35. The resistances of the variable resistors R1 through R4 become infinetely large. Therefore, the signal entering through the input terminal 30 is not attenuated by the series resonant circuits and is led out directly as it is through the output terminal 31.

Thus, in the level control circuit shown in FIG. 6, a phase variation is unavoidable to some degree with respect to signals in bands which are subject to level control. The signal component of a band not subject to level control does not pass through circuits such as filters and resonant circuits as in the prior art arrangements. Thus, the phase characteristic and frequency characteristics undergo no variation whatsoever and remain flat.

In this connection, the level control circuits 13a and 13b are of the same circuit organization. The filter bands of the band-pass filters in the control signal forming circuits 32 through 35 are selected to be bands such as to impart a specific level of attenuation with respect to the sum signal (i.e., bands such that an output signal characteristic as indicated in FIG. 4 can be obtained). The level control circuits 17a and 17b are the same; however, the filter bands of the band-pass filter in the control signal forming circuits are selected to impart a specific attenuation level with respect to the difference signal (i.e., bands such that the output signal characteristic indicated in FIG. 5 can be obtained).

In the operation, when head 21 records the multiplexed signal from the amplifiers 20a and 20b on the record disc 22, the linear speed of the disc 22 relative to the cutting stylus of the head 21 changes as the stylus moves from the outer periphery to the inner part of the disc. Particularly, at the innermost recording part of the disc 22, the relative linear speed becomes low. For this reason, the inclination of the cut groove becomes steep, and the higher harmonics of the direct-wave signal readily mix into the angle-modulated wave signal band. Furthermore, the carrier level of the angle-modulated wave signal also decreases from the outer periphery toward the inner part of the disc.

Consequently, there is a decrease of the ratio between the carrier level of the angle-modulated wave and the level of the higher harmonics of the direct-wave signal, as the stylus travels from the outer periphery toward the inner part of the disc. Distortion tends to arise readily in the demodulated output.

Figure 7:
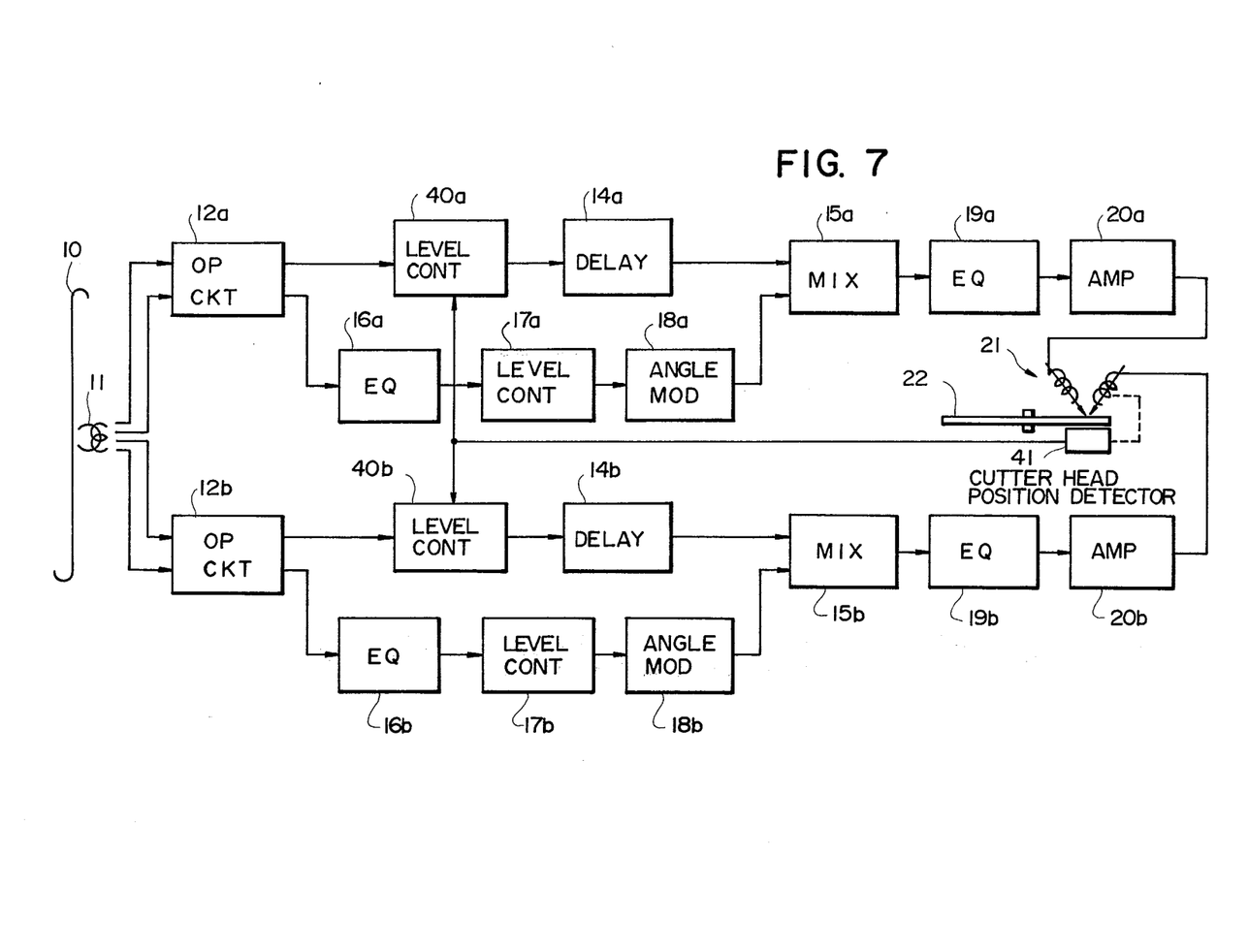
FIG. 7 is a block diagram showing a second embodiment of the system according to the invention.

This problem has been solved in a second embodiment of the invention, as described below in conjunction with FIG. 7. In FIG. 7, parts which are the same as corresponding parts in FIG. 1 are designated by like reference numerals and will not be described again in detail.

In this embodiment, level control circuits 40a and 40b are provided in the transmission system of the sum signal, between the operation circuits 12a and 12b and the mixers 15a and 15b. These level control circuits 40a and 40b accomplish the same level control operation that was described above in connection with the level control circuits 13a and 13b in the preceding first embodiment. At the same time, circuits 40a, 40b are adapted to accomplish the control operation in response to a detection of signals indicating the head position supplied by detector 41. These signals indicate the position of the cutter head 21 and produce an output a signal, in accordance with the position thus detected.

This cutter head position detector 41 operates as the cutter head 21 advances from the outer periphery toward the inner part of the record disc 22 while it records signals on the disc. Detector 41 generates a voltage signal in accordance with the position of the cutter head 21 on the disc 22.

Figures 8, 9, 10:
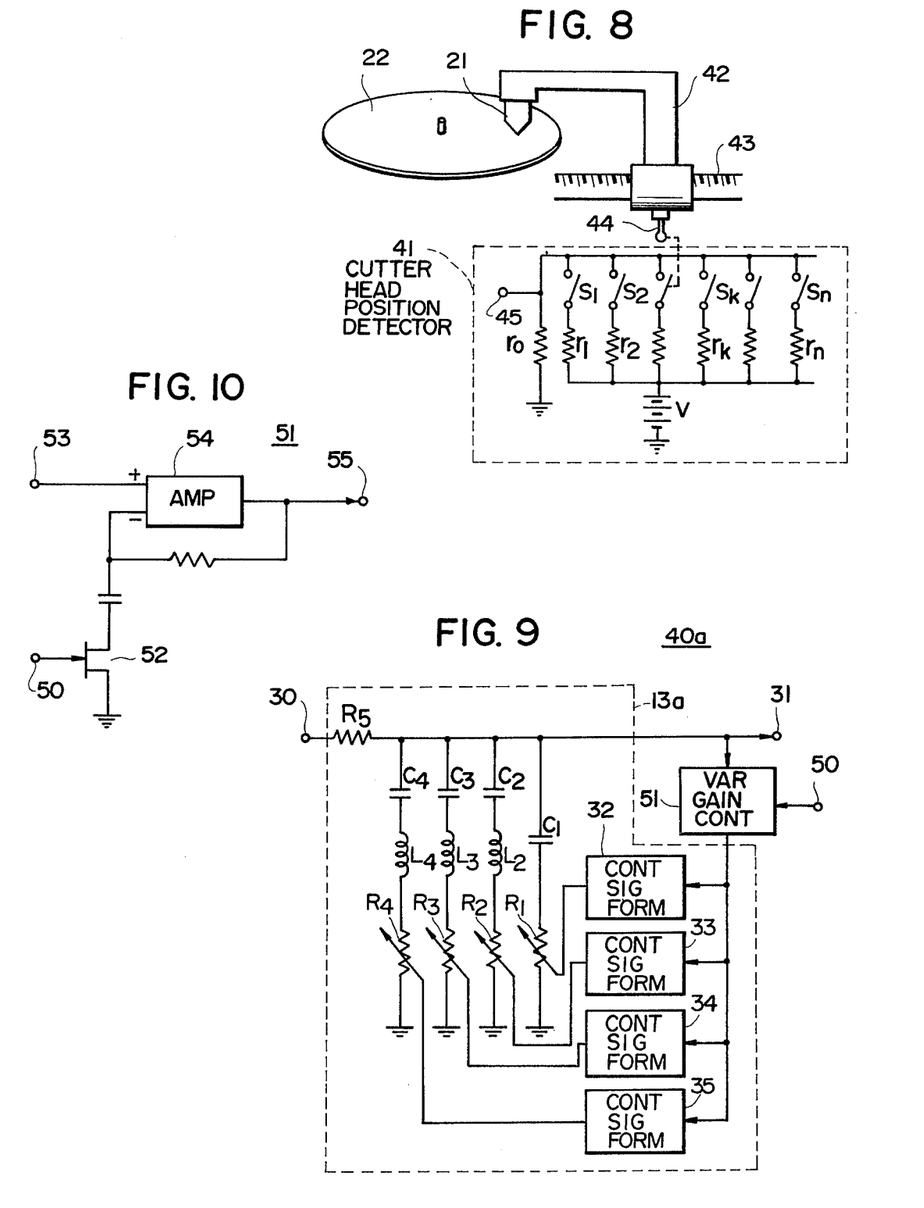
FIG. 8 is a simplified pictorial diagram and schematic circuit diagram showing one example of a cutter head position detector in the system illustrated in FIG. 7.
FIG. 9 is a circuit diagram of one specific embodiment of a level control circuit for use in the system shown in FIG. 7.
FIG. 10 is a circuit diagram showing one embodiment of a variable gain control circuit for use in the circuit illustrated in FIG. 9.

One embodiment of this cutter head position detector 41 is illustrated in FIG. 8. As shown diagrammatically, one end of a cutter head holding arm 42 supports the head 21. The other end is attached to a threaded nut engaged with a screw shaft 43. This screw shaft 43 is adapted to rotate in synchronism with the rotation of the record disc 22. As a consequence, the cutter head holding arm 42 moves with the cutter head 21 as it travels from the outer periphery toward the inner part of the disc 22 and records on the disc. In addition, a projecting member 44 is fixed on the holding arm 42.

The cutter head position detector 41 comprises a circuit including a plurality of series connected microswitches Sk (where $k = 1$ to $n$). Each switch is closed when actuated by the projecting member 44. Resistors $r_k$ (where $k = 1$ to $n$) are mutually connected in parallel, a resistor $r_o$ being connected between the commonly connected contacts of the microswitches Sk and ground. A power source V is connected between commonly connected terminals of the resistors $r_k$ and ground. When the member 44 closes a microswitch Sk, for example, the voltage Vk appears at an output terminal 45 connected between the resistor $r_o$ and the commonly connected stationary contacts of the microswitches; $Vk = [r_o/(r_o + r_k)]$ V. The output voltage signal from the cutter head position detector 41 varies in accordance with the position of the cutter head 21 on the record disc 22, and is applied to the level control circuits 40a and 40b.

One embodiment of the level control circuit 40a is illustrated in FIG. 9. In FIG. 9, parts which are the same as corresponding parts in FIG. 6 are designated by like reference numerals and characters. Detailed description of such parts will not be repeated in the following description.

In FIG. 9, a voltage signal is applied from the cutter head position detector 41 through a terminal 50 to a variable gain control circuit 51, in the level control circuit 40a. This variable gain control circuit 51 has a circuit as shown in FIG. 10, for example. The voltage signal entering through the terminal 50 is applied to the gate of a field effect transistor (FET) 52, in the variable gain control circuit 51. There, it controllably varies the resistance between the drain and source thereof. The FET 52 is connected to a feedback circuit of an amplifier 54. Accordingly, the gain of the amplifier 54 is controlled by the internal resistance variations of the FET 52. As a result, the level of a signal supplied from the input terminal 30, through the resistor R5 (FIG. 9) and to the input terminal 53 (FIG 10) is controlled through the amplifier 54. The output signal, thus level-controlled, is derived from an output terminal 55.

As the cutter head 21 moves from the outer periphery of the record disc 22 toward the inner part thereof, the voltage of the signal from the cutter head position detector 41 becomes progressively higher. In accordance with this increase voltage, the internal resistance of the FET 52 decreases, and the gain of the amplifier 54 becomes large. Consequently, the levels of the signals supplied from the output terminal 55, of the variable gain control circuit 51 to the control signal forming circuits 32 through 35 are progressively increased.

A a consequence, the resistance values of the variable resistors R1 through R4 are progressively decreased. The level of the direct-wave signal reaching the terminal 31 from the terminal 30 is progressively attenuated. Accordingly, the circuit 13a in the level control circuit 40a attenuates a specific band, in accordance with the level of the input direct-wave signal, as described hereinabove in conjunction with FIG. 6. At the same time, responsive to the variable gain control circuit 51, circuit 13a operates in accordance with the voltage signal from the cutter head position detector 41 circuit 13a progressively attenuates the level of the direct-wave signal as the cutter head 21 travels from the outer periphery toward the inner part of the disc 22.

In accordance with this embodiment, therefore, there is a reduction of the distortion, particularly at positions of the cutter head near the innermost recording parts of the record disc.

This reduction is in addition to the reduced distortion enjoyed by the system of the preceding first embodiment.

Further, this invention is not limited to these embodiments. Many variations and modifications may be made without departing from the scope and spirit of the invention.

What is claimed is:

1. A multichannel record disc recording system comprising:
    means for supplying a plurality of input channel signals;
    operation means for forming a sum signal and a difference signal from each of a matched pair of the plurality of channel signals;
    means for angle-modulating a carrier responsive to the difference signal from said operation means to produce an angle-modulated difference signal;
    mixing means for multiplexing the sum signal and angle-modulated difference signal to produce a multiplexed signal;
    record cutting means for recording the multiplexed signal in one groove cut on the record disc;
    first level control means for controlling the level of the sum signal when the sum signal has a higher than a predetermined level to prevent admixing the higher harmonics of the sum signal into the band of the angle-modulated difference signal; and
    second level control means between the operation means and the angle-modulating means for controlling the level of the difference signal in a manner which attenuates the level of the difference signal to prevent overmodulation due to the difference signal being of a high level in angle-modulation responsive to the difference signal in the angle-demodulation means.

2. A multichannel record disc recording system as claimed in claim 1 in which there is further provided an equalizer means having an RIAA characteristic for increasing the level of the high-frequency band of components of the sum signal, and means for controlling the first level control means when the high-frequency band of components of the sum signal is of a high level, which attenuates the level of the high-frequency band of components.

3. A multichannel record disc recording system as claimed in claim 1 in which the second level control means accomplishes said level control responsive to a high level of the middle-high frequency band of components which are above approximately 1 KHz of the difference signal, said second level control means attenuating the level of the middle-high frequency band of components.

4. A multichannel record disc recording system as claimed in claim 1 in which each of the first and second level control means comprises at least one attenuation circuit means for attenuating an input signal and at least one control signal forming circuit means for forming a control signal when the level of said input signal exceeds a predetermined level, the attenuation circuit means operating responsive to the control signal to attenuate the level of the input signal and, when not operating, the attenuation circuit means passing the signal through the level control means without attenuation.

5. A multichannel record disc recording system as claimed in claim 1 in which each of the first and second level control means comprises at least one series connected resonant circuit comprising a series connection including at least a capacitor and a variable resistor, said resonant circuit being connected between a signal transmission path and ground in order to attenuate the input signal to said one level control means and a control signal forming circuit means responsive to the input signal and forming a control signal when the level of the input signal is higher than a predetermined level, and means for applying the control signal to the variable resistor of the series connected resonant circuit, said variable resistance having a characteristic which reduces the resistance of the variable resistor responsive to the control signal and increases the resistance to become substantially infinite when the control signal is not being applied to the variable resistor, whereby the resonant circuit is not resonant and does not attenuate the input signal in the absence of the control signal and does become resonant and attenuate when the control signal is applied to the variable resistor.

6. A multichannel record disc recording system as claimed in claim 1 which further comprises means for generating a detection signal in accordance with the position of the record groove cutting means as it travels radially across the disc, the first level control means operating in response to the detection signal to decrease progressively the level of the sum signal as the record cutting means moves radially across the disc from the outer periphery toward the inner part thereof.

7. A multichannel record disc recording system as claim in claim 6, in which the first level control means comprises at least one attenuation circuit for attenuating the input signal applied to the first level control means, at least one control signal forming circuit means for forming a control signal when the level of the input signal exceeds a predetermined level, and means responsive to the detection signal for progressively increasing the level of the input signal to the control signal forming circuit as the record groove cutting means moves over the disc from the outer periphery thereof toward the inner part thereof.

* * * * *